(12) United States Patent
Hamada

(10) Patent No.: US 8,052,320 B2
(45) Date of Patent: Nov. 8, 2011

(54) BACKLIGHT DEVICE, DISPLAY DEVICE AND TELEVISION RECEIVER

(75) Inventor: Tetsuya Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/812,410

(22) PCT Filed: Oct. 3, 2008

(86) PCT No.: PCT/JP2008/068035
§ 371 (c)(1),
(2), (4) Date: Jul. 9, 2010

(87) PCT Pub. No.: WO2009/107270
PCT Pub. Date: Sep. 3, 2009

(65) Prior Publication Data
US 2010/0283914 A1  Nov. 11, 2010

(30) Foreign Application Priority Data
Feb. 28, 2008 (JP) .................. 2008-047530

(51) Int. Cl.
*F21V 7/04* (2006.01)
(52) U.S. Cl. ........ 362/622; 362/608; 362/231; 362/293; 362/583

(58) Field of Classification Search ............... 362/608, 362/615, 621, 522, 231, 293
See application file for complete search history.

(56) References Cited

U.S. PATENT DOCUMENTS

| | | | |
|---|---|---|---|
| 6,210,012 B1 | 4/2001 | Broer | |
| 7,038,391 B2 * | 5/2006 | Tsumura | ............... 315/169.1 |
| 7,887,206 B2 * | 2/2011 | Lee | ............... 362/84 |
| 2006/0002131 A1 | 1/2006 | Schultz et al. | |

FOREIGN PATENT DOCUMENTS

| | | |
|---|---|---|
| JP | 5-137625 A | 6/1993 |
| JP | 2002-500816 A | 1/2002 |
| JP | 2002-270022 A | 9/2002 |
| JP | 2005-183139 A | 7/2005 |
| JP | 2008-505445 A | 2/2008 |

* cited by examiner

*Primary Examiner* — Ali Alavi
(74) *Attorney, Agent, or Firm* — Birch, Stewart, Kolasch & Birch, LLP

(57) ABSTRACT

To provide a backlight device with which a color hue and a color purity of a display panel can be improved while suppressing the lowering of the brightness of the display panel. A backlight device (20) comprises a pseudo white LED (21), a light guide plate (22), and a dichroic filter (25) which reflects a light with a predetermined wavelength among the light emitted from the pseudo white LED at a predetermined ratio. The dichroic filter is configured so that the light reflectance changes when the incident angle of the light is changed and a tilt angle to a light emitting surface (21e) of the pseudo white LED can be adjusted.

20 Claims, 11 Drawing Sheets

BACKLIGHT DEVICE, DISPLAY DEVICE AND TELEVISION RECEIVER

TECHNICAL FIELD

The present invention relates to a backlight device, a display device and a television receiver, and more specifically relates to a backlight device, a display device and a television receiver that are provided with a white light source.

BACKGROUND ART

Conventionally, backlight devices provided with a white light source such as a pseudo white LED (pseudo white light emitting diode) and an RGB-LED have been known.

A pseudo white LED is formed with, for example, a blue light emitting element and a fluorescent material that converts light emitted from the blue light emitting element into light having a longer wavelength than blue light. Here, pseudo white light is obtained through additive mixture of blue light and light having a longer wavelength than blue light. With a backlight device using such a pseudo white LED, pseudo white light includes a large amount of light whose wavelength is between B (blue) and G (green) (for example, a wavelength of 490 nm-510 nm) and a large amount of light whose wavelength is between G (green) and R (red) (for example, a wavelength of 570 nm-590 nm). As a result, when the pseudo white light obtained with such a backlight device is irradiated onto a display panel, a large amount of light whose wavelength is between B (blue) and G (green) is transmitted through the B and G regions of a color filter of the display panel, and a large amount of light whose wavelength is between G (green) and R (red) is transmitted through the G and R regions of the color filter of the display panel. This degrades color hues and color purity on the display panel. In addition, since wavelengths of B (blue) and G (green) are closer to each other than wavelengths of G (green) and R (red) are to each other, the color hues and the color purity of B (blue) and those of G (green) are particularly degraded.

On the other hand, an RGB LED is formed with blue, green and red light emitting elements. Here, white light is obtained through additive mixture of blue, green and red light. With such an RGB LED as well, since the wavelengths of B (blue) light and G (green) light are comparatively close to each other, light whose wavelength is between B (blue) and G (green) is transmitted through the B and G regions of the color filter of the display panel. This degrades color hues and color purity of B (blue) and those of G (green).

To cope with this, there have conventionally been proposed display devices provided with a backlight device capable of improving color hues and color purity on a display panel (see, for example, Patent Document 1).

Patent Document 1 discloses a liquid crystal display device provided with a white light source, a light guide plate on which light emitted from the white light source is incident, a color liquid crystal device (a display panel) which is irradiated with light emitted from the light guide plate, and a color correction plate (a filter member) which is placed on a light incident surface and/or a light emission surface of the light guide plate. Patent Document 1 teaches that the color correction plate absorbs light having a wavelength of around 500 nm and light having a wavelength of around 590 nm at a predetermined ratio. This helps prevent light that has passed through the color liquid crystal device from including a large amount of light whose wavelength is between B (blue) and G (green) or a large amount of light whose wavelength is between G (green) and R (red).

Patent Document 1: JP-A-2005-183139

DISCLOSURE OF THE INVENTION

Problems to be Solved by the Invention

However, with the invention disclosed in Patent Document 1 mentioned above, if the output wavelength of the white light source varies such that the amount of light having a wavelength of around 500 nm and the amount of light having a wavelength of around 590 nm are increased, it is difficult for the color correction plate (the filter member) to sufficiently absorb such light. This results in a problem that it is difficult to prevent degradation of color hues and color purity on the color liquid crystal device (the display device). On the other hand, in a case in which the filter member is formed to have a higher optical absorptance in consideration of variation of the output wavelength of the white light source, if the variation in output wavelength of the white light source is small, light is absorbed more than necessary, and this leads to a problem that the brightness of the color liquid crystal device (the display panel) is reduced.

The present invention has been made to solve the above problems, and an object of the present invention is to provide a backlight device, a display device, and a television receiver that are capable of improving color hues and color purity on a display panel while preventing reduction of the brightness of the display panel.

Means for Solving the Problem

To achieve the above object, according to a first aspect of the present invention, a backlight device is provided with: a white light source having a first light emission surface; a light transmitting member having a light incident surface on which light emitted from the first light emission surface of the white light source is incident, and a second light emission surface from which incident light is emitted; and a filter member that is arranged in a region through which light emitted from the white light source passes, the filter member absorbing or reflecting, at a predetermined ratio, light having a predetermined wavelength included in light emitted from the white light source. Here, the filter member is arranged so as to be tilted with respect to at least either the first light emission surface of the white light source or the second light emission surface of the light transmitting member; the filter member is structured such that absorptance or reflectance of light having the predetermined wavelength varies as an incident angle of light varies; and the filter member is structured such that a tilt angle at which the filter member is tilted with respect to at least either the first light emission surface of the white light source or the second light emission surface of the light transmitting member is adjustable.

As just described, with the backlight device according to the first aspect, the absorptance or the reflectance of light included in light emitted from the white light source and having the predetermined wavelength can be controlled by structuring the filter member, which is structured such that the absorptance or reflectance of light having the predetermined wavelength varies as the incident angle of light varies, such that the angle at which the filter member is tilted with respect to at least either the first light emission surface of the white light source or the second light emission surface of the light transmitting member is adjustable. Thus, in a case in which there is large variation in wavelength, etc., of light emitted from the white light source, light having a predetermined wavelength (for example, light having a wavelength of around 500 nm or 580 nm) can be sufficiently absorbed or reflected by the filter member. As a result, it is possible to prevent light that has passed through a display panel from including a large amount of light whose wavelength is between B (blue) and G (green) (for example, light whose wavelength is around 500 nm) or a large amount of light whose wavelength is between G (green) and R (red) (for example, light whose wavelength is around 580 nm), and this makes it possible to improve color hues and color purity on display panels. On the other hand, in a case in which the variation in wavelength, etc., of light emitted from the white light source is small, the absorptance or the reflectance at which the filter member absorbs or reflects light can be reduced. As a result, unnecessary absorption or reflection of light can be prevented, and degradation in brightness of display panels can consequently be prevented.

In the backlight device according to the first aspect described above, it is preferable that the filter member is adjusted such that the tilt angle at which the filter member is tilted with respect to at least either the first light emission surface of the white light source or the second light emission surface of the light transmitting member is increased so as to increase the absorptance or reflectance of light having the predetermined wavelength, while the tilt angle at which the filter member is tilted with respect to at least either the first light emission surface of the white light source or the second light emission surface of the light transmitting member is reduced so as to reduce the absorptance or reflectance of light having the predetermined wavelength. This structure makes it possible to easily control the absorptance or reflectance of light included in light emitted from the white light source and having a predetermined wavelength.

In the backlight device according to the first aspect described above, it is preferable that the light transmitting member includes a light guide plate. With this structure, the present invention can be applied to an edge-light type backlight device using a light guide plate.

In the above-described backlight device in which the light transmitting member includes a light guide plate, it is preferable that the filter member is arranged between the first light emission surface of the white light source and a light incident surface of the light transmitting member. With this structure, in the backlight device using a light guide plate, where the area of the light incidence surface of the light guide plate (the light transmitting member) is smaller than the area of the second light emission surface of the light guide plate, the filter member can be made smaller than in a case in which the filter member is arranged on the second light emission surface side of the light guide plate (the light transmitting member).

In the above-described backlight device in which the filter member is arranged between the first light emission surface of the white light source and the light incident surface of the light transmitting member, it is preferable that the filter member is arranged to be tilted with respect to the first light emission surface of the white light source, and that the filter member is structured such that the tilt angle at which the filter member is tilted with respect to the first light emission surface of the white light source is adjustable. This structure makes it possible to easily control the absorptance or the reflectance of light having the predetermined wavelength and included in light emitted from the white light source.

In the backlight device according to the first aspect described above, it is preferable that the white light source includes a blue light emitting element and a fluorescent material having a function of converting light emitted from the blue light emitting element into light having a wavelength that is longer than a wavelength of blue light. Since light (pseudo white light) emitted from such a white light source including a blue light emitting element and a fluorescent material includes a particularly large amount of light whose wavelength is between B (blue) and G (green) (for example, a wavelength of around 500 nm) and a particularly large amount of light whose wavelength is between G (green) and R (red) (for example, a wavelength of around 580 nm), it is particularly effective to apply the present invention to backlight devices using a white light source including a blue light emitting element and a fluorescent material.

It is preferable that the backlight device according to the first aspect described above further includes a housing member housing the white light source, the light transmitting member, and the filter member, that, in the housing member, there is formed an engagement portion in which one end of the filter member is engaged, and that the tilt angle at which the filter member is tilted with respect to at least either the first light emission surface of the white light source or the second light emission surface of the light transmitting member is adjusted by rotating the filter member around the engagement portion of the housing member. This structure makes it possible to easily adjust the tilt angle at which the filter member is tilted with respect to at least either the first light emission surface of the white light source or the second light emission surface of the light transmitting member.

In the backlight device provided with the housing member, it is preferable that another end of the filter member is provided with a fixing member fixing the other end of the filter member. This structure makes it possible to easily hold constant the tilt angle at which the filter member is tilted with respect to at least either the first light emission surface of the white light source or the second light emission surface of the light transmitting member.

In the backlight device provided with the housing member, it is preferable that an angle adjustment member is fitted to the other end of the filter member, the angle adjustment member adjusting the tilt angle at which the filter member is tilted with respect to at least either the first light emission surface of the white light source or the second light emission surface of the light transmitting member by moving in a direction perpendicular to the first light emission surface of the white light source. This structure makes it possible to adjust the tilt angle at which the filter member is tilted with respect to at least either the first light emission surface of the white light source or the second light emission surface of the light transmitting member more easily.

In the backlight device according to the first aspect, it is preferable that the filter member has a function of absorbing or reflecting, at a predetermined ratio, light having a wavelength of 490 nm-510 nm included in light emitted from the white light source. Since the wavelength of B (blue) light and the wavelength of G (green) light are closer to each other than the wavelength of G (green) light and the wavelength of R (red) light are, it is particularly effective to use the filter member to absorb or reflect light having a wavelength of 490 nm-510 nm.

In the above-described backlight device according to the first aspect, it is preferable that the filter member includes a dichroic filter having a multi-layered film formed with layers having different refractive indices stacked together. This makes it possible to easily structure the filter member such that it absorbs or reflects light included in light emitted from the white light source and having a predetermined wavelength at a predetermined ratio, and such that absorptance or reflectance of light having a predetermined wavelength varies as the incident angle of light varies.

In the backlight device according to the first aspect described above, it is preferable that the filter member includes a first filter member that absorbs or reflects light having a first wavelength at a predetermined ratio, and a second filter member that absorbs or reflects light having a second wavelength at a predetermined ratio. With this structure, for example, light having a wavelength of around 500 nm and light having a wavelength of around 590 nm can be sufficiently absorbed or reflected by the filter member, and this helps further improve color hues and color purity on display panels.

In the backlight device in which the filter member includes the first and second filter members, it is preferable that the first and second filter members are structured such that angles at which the first and second filter members are tilted with respect to at least either the first light emission surface of the white light source or the second light emission surface of the light transmitting member are independently adjustable. With this structure, for example, the absorptance or the reflectance of light having a wavelength of around 500 nm and the absorptance or the reflectance of light having a wavelength of around 590 nm can be independently controlled. This contributes to further improvement of color hues and color purity on display panels.

According to a second aspect of the present invention, a display device is provided with any of the backlight devices described above and a display panel that is illuminated by the backlight device and includes a color filter. A display device having this structure is capable of improving color hues and color purity on the display panel while preventing reduction of the brightness of the display panel.

According to a third aspect of the present invention, a television receiver is provided with the just-described display device, a cabinet in which the display device is housed, a tuner, and a speaker. This structure makes it possible to obtain a television receiver that is capable of improving color hues and color purity on the display panel while preventing reduction of the brightness of the display panel.

Advantages of the Invention

As described above, according to the present invention, it is possible to easily obtain a backlight device, a display device, and a television receiver that are capable of improving color hues and color purity on display panels while preventing reduction of the brightness of display panels.

Figure 1:
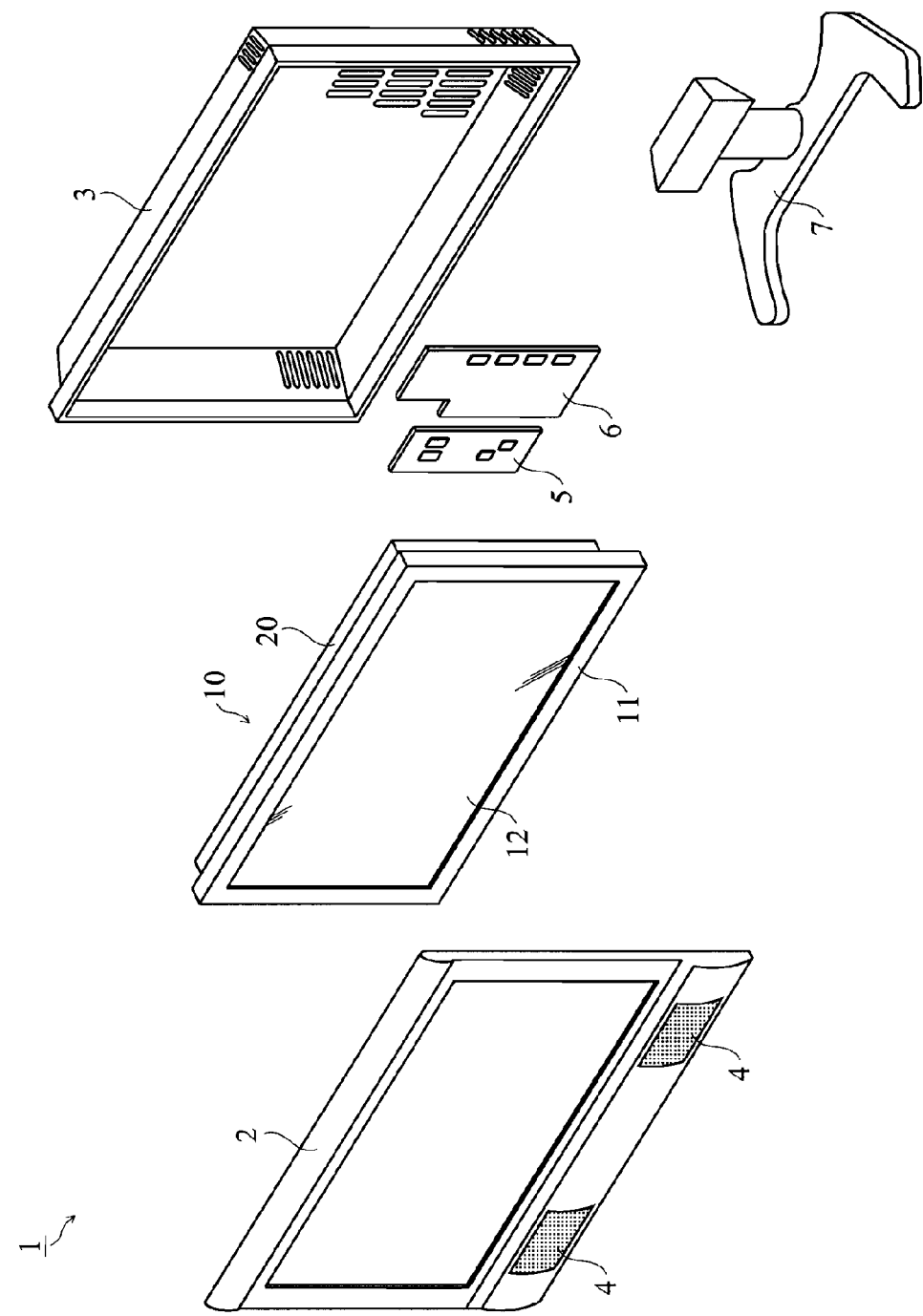
FIG. 1 is an exploded perspective view showing the entire structure of a liquid crystal television receiver provided with a backlight device according to a first embodiment of the present invention.

LIST OF REFERENCE SYMBOLS 1 liquid crystal television receiver (television receiver)
2 front cabinet (cabinet)
3 rear cabinet (cabinet)
4 speaker
5 tuner
10 liquid crystal display device (display device)
12 liquid crystal display panel (display panel)
20, 30, 40, 60, 70 backlight devices
21 pseudo white LED (white light source)
21$a$ blue light emitting element
21$b$ fluorescent material
21$c$ light emission surface (first light emission surface)
22 light guide plate (light transmitting member)
22$a$ light incident surface 22*b* light emission surface (second light emission surface)
25 dichroic filter (filter member, first filter member)
25*d*, 25*e* layers (layers having different refractive indices)
25*f*, 25*g* layers (layers having different refractive indices)
26, 36, 46 front chassis (housing members)
27, 37, 47 rear chassis (housing members)
27*a*, 37*a*, 37*b*, 47*a* recesses (engagement portions)
28, 38, 68 slide members (fixing members, angle adjustment members)
35 dichroic filter (filter member, second filter member)
50, 50*a* white light sources
75 dichroic filter (filter member)
121*a* color filter
α1, α2, α3, α11, α12, α13 incident angles
θ1, θ2, θ3 tilt angles

BEST MODE FOR CARRYING OUT THE INVENTION

First Embodiment

With reference to FIGS. 1 to 14, a description will be given of a liquid crystal television receiver 1 provided with a backlight device 20 according to a first embodiment of the present invention. The liquid crystal television receiver 1 is an example of the "television receiver" of the present invention.

As shown in FIG. 1, the liquid crystal television receiver 1 provided with the backlight device 20 according to the first embodiment of the present invention is provided with: a liquid crystal display device 10 including the backlight device 20; a front cabinet 2 and a rear cabinet 3 housing the liquid crystal display device 10; a speaker 4 fitted to the front cabinet 2; a tuner 5; a power supply 6; and a support member 7. As the front cabinet 2, the rear cabinet 3, the speaker 4, the tuner 5, the power supply 6, and the support member 7, conventional ones that have commonly been used can be applied, and thus they will each be briefly described. The liquid crystal display device 10 is an example of the "display device" of the present invention, and the front cabinet 2 and the rear cabinet 3 are an example of the "cabinet" of the present invention.

The front cabinet 2 and the rear cabinet 3 store the liquid crystal display device 10, the tuner 5, and the power supply 6. The tuner 5 has a function of generating an image signal and an audio signal of a predetermined channel from a radio wave it receives. The speaker 4 has a function of emitting sound based on the audio signal generated by the tuner 5. The power supply 6 is structured to supply power to the liquid crystal display device 10, the speaker 4, and the tuner 5. The liquid crystal display device 10 is supported by the support member 7. The speaker 4, the tuner 5, and the power supply 6 may be fitted to the liquid crystal display device 10.

The liquid crystal display device 10 is composed of a bezel 11, a liquid crystal display panel 12 whose end portion is covered with the bezel 11, and the backlight device 20 that is arranged on the rear surface side of the liquid crystal display panel 12. The liquid crystal display panel 12 is an example of the "display panel" of the present invention.

Figure 2:
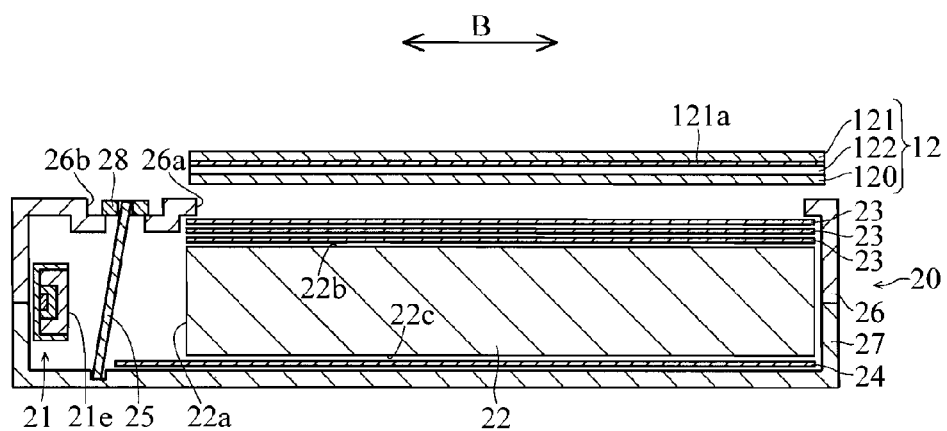
FIG. 2 is a sectional view showing the structure of the backlight device and liquid crystal display panel according to the first embodiment of the present invention.

As shown in FIG. 2, the liquid crystal display panel 12 includes an AM substrate (active matrix substrate) 120 and a counter substrate 121 arranged opposite to the AM substrate 120. Liquid crystal 122 is sealed between the AM substrate 120 and the counter substrate 121. And the liquid crystal display panel 12 functions as a display panel by being illuminated by the backlight device 20.

Figure 3:
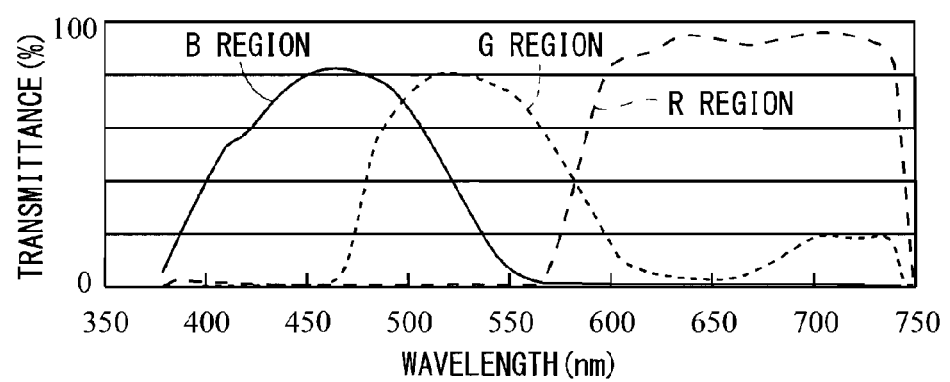
FIG. 3 is a diagram showing the transmission characteristic (reflection characteristic) of a color filter for the liquid crystal display panel used with the backlight device according to the first embodiment shown in FIG. 2.

The counter substrate 121 is provide with a color filter 121*a* in which unillustrated B, G and R regions are formed. The B, G and R regions of the color filter 121*a* have a function of transmitting light having a predetermined wavelength. Specifically, the B, G and R regions of the color filter 121*a* have transmission characteristics as shown in FIG. 3. Accordingly, light (such as light having a wavelength of around 500 nm) whose wavelength is between B (blue) and G (green) passes through the B and G regions, while light (such as light having a wavelength of around 580 nm) whose wavelength is between G (green) and R (red) passes through the G and R regions. The wavelength of light passing through the B region and that of light passing through the G region are notably closer to each other than the wavelength of light passing through the G region and that of light passing through the R region are to each other. That is, in FIG. 3, the B and G regions overlap each other over a wider area than the G and R regions overlap each other. Accordingly, a large amount of light whose wavelength is between B (blue) and G (green) (for example, light having a wavelength of around 500 nm) tends to pass through the B and G regions.

As shown in FIG. 2, the backlight device 20 is an edge-light type backlight device, and composed of a plurality of pseudo white LEDs 21, a light guide plate 22 having a light incident surface 22*a* on which light from the pseudo white LEDs 21 is incident, a plurality of optical sheets 23 arranged on a light emission surface 22*b* side of the light guide plate 22; a reflection sheet 24 arranged on a rear surface 22*c* side of the light guide plate 22; a dichroic filter 25 arranged between the pseudo white LEDs 21 and the light guide plate 22; and a front chassis 26 and a rear chassis 27 in which these components are housed. The pseudo white LEDs 21 are an example of the "white light source" of the present invention. The light guide plate 22 is an example of the "light transmitting member" of the present invention, and the light emission surface 22*b* is an example of the "second light emission surface" of the present invention. The dichroic filter 25 is an example of the "filter member" of the present invention, and the front chassis 26 and the rear chassis 27 are an example of the "housing member" of the present invention.

Figure 4:
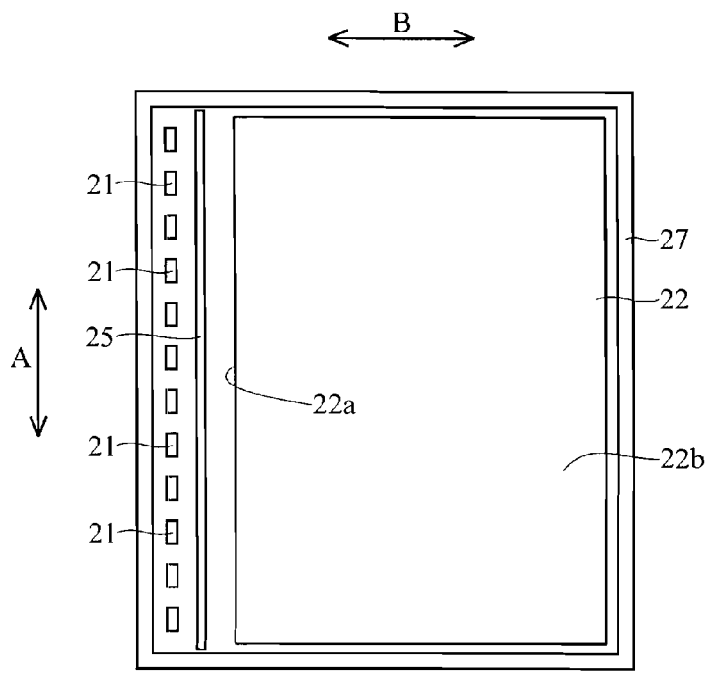
FIG. 4 is a plan view showing the structure of the backlight device according to the first embodiment shown in FIG. 2.
Figure 5:
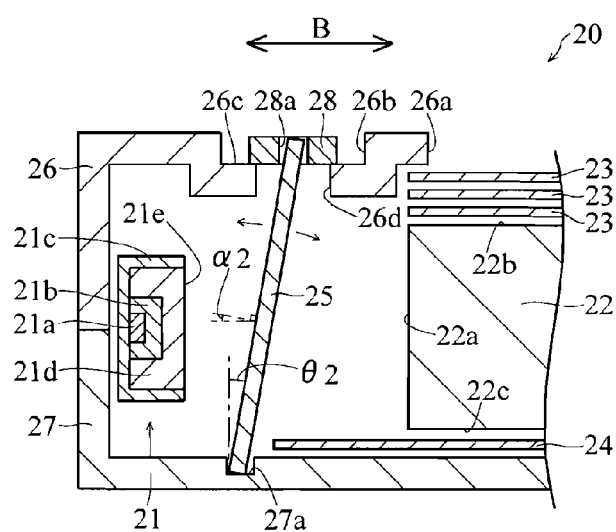
FIG. 5 is a sectional view showing the structure in the vicinity of a dichroic filter used in the backlight device according to the first embodiment shown in FIG. 2.

The plurality of pseudo white LEDs 21 are, as shown in FIGS. 2 and 4, arranged at predetermined pitches in direction A (see FIG. 4) so as to face the light incident surface 22*a* of the light guide plate 22. As shown in FIG. 5, the pseudo white LEDs 21 are each composed of a blue light emitting element 21*a*, a fluorescent material 21*b* arranged so as to cover the blue light emitting element 21*a*, a package main body portion 21*c* in which the blue light emitting element 21*a* and the fluorescent material 21*b* are placed, and a protection member 21*d* which is made of resin and provided for protecting the blue light emitting element 21*a* and the fluorescent material 21*b*.

Figure 6:
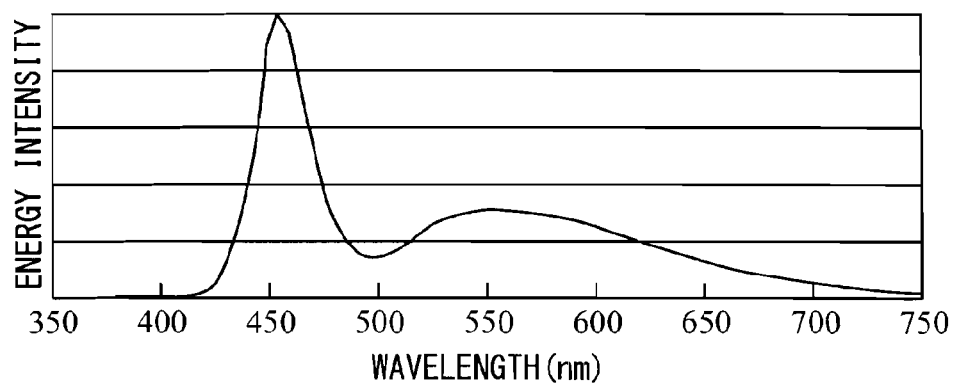
FIG. 6 is a diagram showing the light emission spectrum of a pseudo white LED used in the backlight device according to the first embodiment shown in FIG. 2.

The blue light emitting element 21*a* has a function of emitting blue light whose peak wavelength is, for example, close to about 440 nm-about 460 nm The fluorescent material 21*b* has a function of converting part of blue light emitted from the blue light emitting element 21*a* into light (for example, light in a wavelength band from green to red light) that has a longer wavelength than blue light. Thus, the light emission spectrum of light (pseudo white light) emitted from the light emission surface 21*e* of each of the pseudo white LEDs 21 is, for example, as shown in FIG. 6. The light emission surface 21*e* is an example of the "first light emission surface" of the present invention.

As shown in FIG. 2, the light guide plate 22 has functions of receiving light (pseudo white light) from the pseudo white LEDs 21 at the light incident surface 22*a* and emitting light from the light emission surface 22*b* to the liquid crystal display panel 12. The light incident surface 22*a* of the light guide plate 22 is smaller in area than the light emission surface 22*b*.

The optical sheets 23 include a prism sheet, a lens sheet, etc., and have a function of concentrating light from the light guide plate 22 within a predetermined viewing angle. The reflection sheet 24 has a function of reflecting light emitted from the rear surface 22c of the light guide plate 22 and make the reflected light travel to the light guide plate 22 side (front side).

Here, in the first embodiment, the dichroic filter 25 is arranged between the light emission surfaces 21e of the pseudo white LEDs 21 and the light incident surface 22a of the light guide plate 22. That is, the dichroic filter 25 is arranged within a region through which light emitted from the pseudo white LEDs 21 passes.

Figure 7:
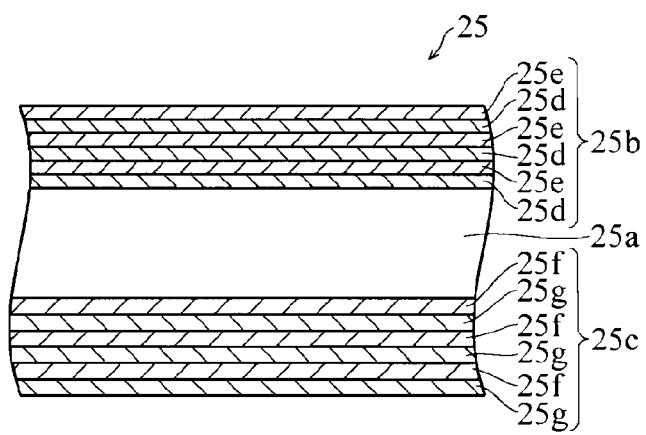
FIG. 7 is a detailed sectional view showing the structure of the dichroic filter used in the backlight device according to the first embodiment shown in FIG. 2.

Also, as shown in FIG. 7, the dichroic filter 25 is composed of a glass substrate 25a, a vapor deposition film 25b formed on one surface of the glass substrate 25a, and a vapor deposition film 25c formed on the other surface of the glass substrate 25a.

The vapor deposition film 25b is a multi-layered film formed of two types of layers 25d and 25e having different refractive indices stacked together. The vapor deposition film 25b is formed of three layers 25d and three layers 25e stacked together in FIG. 7, but instead, it may be formed of two or less or four or more of the layers 25d and two or less or four or more of the layers 25e. The layer 25d and the layer 25e are an example of "layers having different refractive indices" of the present invention.

Likewise, the vapor deposition film 25c is a multi-layered film formed of two types of layers 25f and 25g having different refractive indices stacked together. The vapor deposition film 25c may also be formed of two or less or four or more of the layers 25f and two or less or four or more of the layers 25g. The layer 25f and the layer 25g are an example of "layers having different refractive indices" of the present invention.

Figure 8:
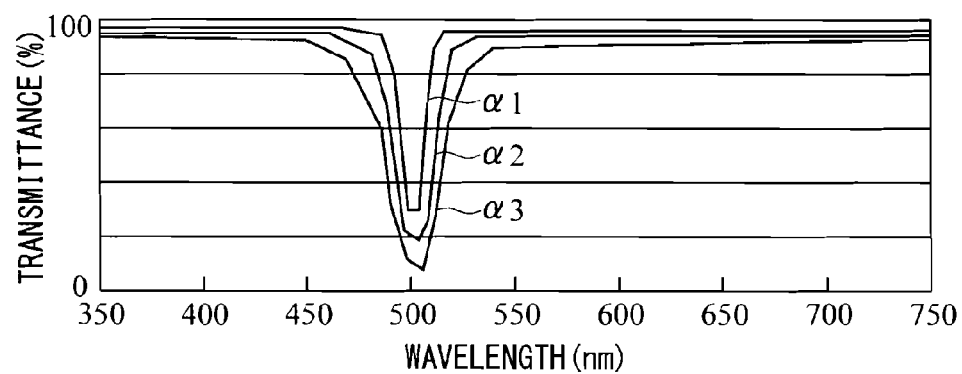
FIG. 8 is a diagram showing the transmission characteristic (reflection characteristic) of the dichroic filter used in the backlight device according to the first embodiment shown in FIG. 2.

In the first embodiment, as shown in FIG. 8, the dichroic filter 25 has a function of reflecting (transmitting) light having a wavelength of about 490 nm-about 510 nm (a wavelength of around 500 nm) at a predetermined ratio.

In the first embodiment, the dichroic filter 25 is structured such that the reflectance (the transmittance) varies as the incident angle of light varies. Specifically, the dichroic filter 25 is structured such that the reflectance of light having a wavelength of about 490 nm-about 510 nm increases as the incident angle of light increases from $\alpha 1=5°$ to $\alpha 2=10°$, $\alpha 3=15°$. That is, the dichroic filter 25 is structured such that the transmittance of light having a wavelength of about 490 nm-about 510 nm decreases as the incident angle of light increases. Furthermore, the dichroic filter 25 is structured such that the wavelength band in which the dichroic filter 25 reflects light becomes wider as the incident angle of light increases from $\alpha 1=5°$ to $\alpha 2=10°$, $\alpha 3=15°$.

Moreover, according to the first embodiment, the dichroic filter 25 is, as shown in FIG. 5, arranged so as to be tilted with respect to the light emission surfaces 21e of the pseudo white LEDs 21. Moreover, the dichroic filter 25 is structured such that the tilt angle at which the dichroic filter 25 is tilted with respect to the light emission surfaces 21e of the pseudo white LEDs 21 is adjustable as will be described later.

The Front chassis 26 and the rear chassis 27 are formed of resin. The front chassis 26 and the rear chassis 27 may be formed of metal.

Also, in the first embodiment, a recess 27a is formed in the rear chassis 27, and one end of the dichroic filter 25 is engaged in the recess 27a. And, by rotating the dichroic filter 25 around the recess 27a of the rear chassis 27 (the one end of the dichroic filter 25) with the one end of the dichroic filter 25 engaged in the recess 27a of the rear chassis 27, the tilt angle of the dichroic filter 25 with respect to the light emission surfaces 21e of the pseudo white LEDs 21 is adjusted. The recess 27a is an example of the "engagement portion" of the present invention.

Figure 9:
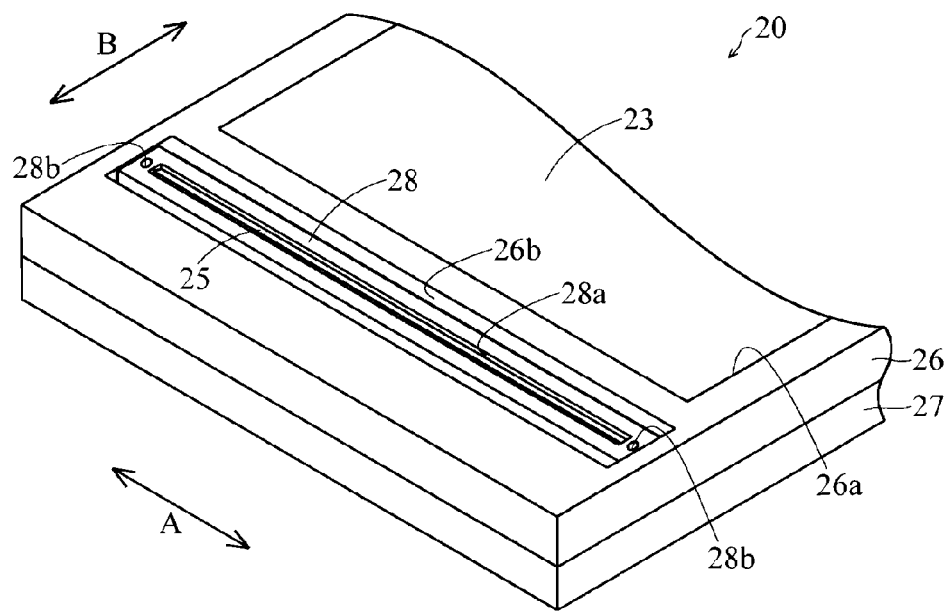
FIG. 9 is a perspective view for illustrating the structure of the backlight device according to the first embodiment shown in FIG. 2.
Figure 10:
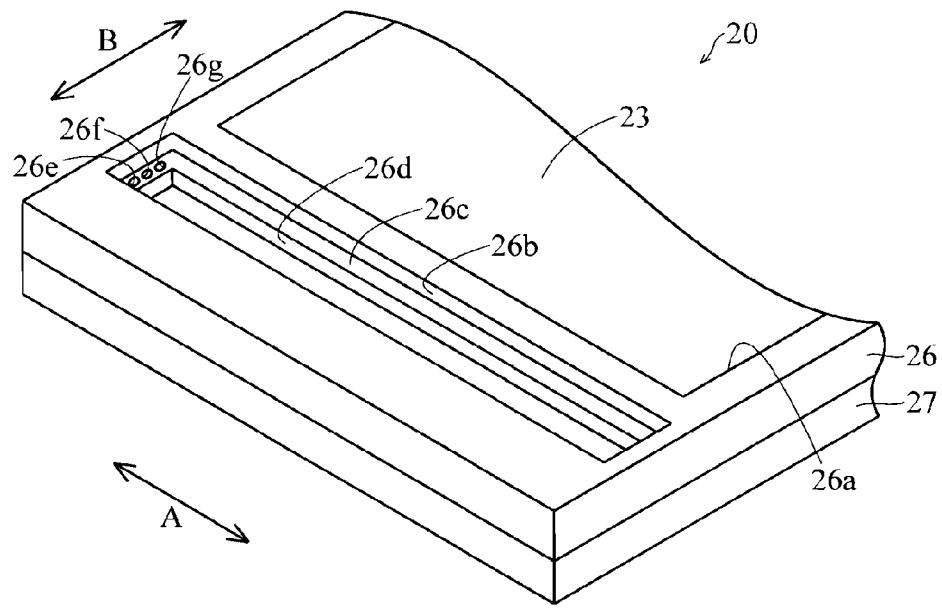
FIG. 10 is a perspective view for illustrating the structure of the backlight device according to the first embodiment shown in FIG. 2.
Figure 11:
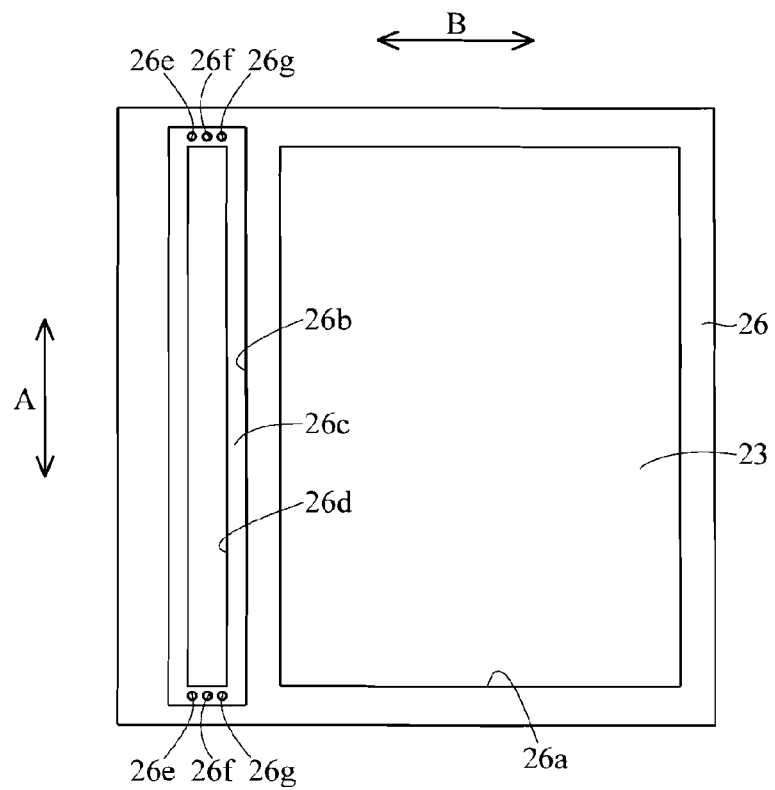
FIG. 11 is a plan view for illustrating the structure of the backlight device according to the first embodiment shown in FIG. 2.

The front chassis 26 has a function of holding the light guide plate 22, the optical sheets 23, and the like in predetermined positions. Furthermore, in the front chassis 26, as shown in FIGS. 5 and 9, there are provided an opening 26a formed corresponding to the front side portion of the optical sheets 23, and a recess 26b extending in direction A (see FIG. 9) with a predetermined distance from the opening 26a. In the recess 26b, as shown in FIGS. 5, 10 and 11, a step portion 26c is formed. In the step portion 26c, an insertion portion 26d is formed to extend in direction A. Into the insertion portion 26d, as shown in FIG. 5, the other end of the dichroic filter 25 is inserted. Furthermore, as shown in FIGS. 10 and 11, a screw hole 26e, a screw hole 26f, and a screw hole 26g are formed in each of two end portions of the step portion 26c in direction A.

As shown in FIGS. 5 and 9, a slide member 28 is placed in the recess 26b. The slide member 28 is formed so as not to project from the front face of the front chassis 26. In this way, the thickness of the backlight device 20 can be prevented from being increased due to the provision of the slide member 28. The slide member 28 is an example of the "fixing member" and the "angle adjustment member" of the present invention.

The slide member 28 is formed such that its length in direction A is substantially equal to or slightly shorter than the length of the recess 26b in direction A. The slide member 28 is also formed such that its length in direction B is shorter than the length of the recess 26b in direction B. Thus, the slide member 28 can be moved within the recess 26b in direction B.

Figure 12:
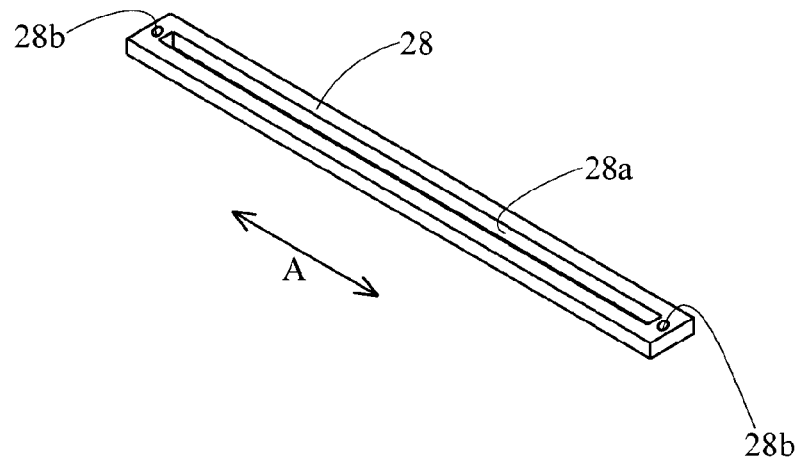
FIG. 12 is a perspective view showing the structure of a slide member used in the backlight device according to the first embodiment shown in FIG. 2.

In the slide member 28, as shown in FIG. 12, an insertion portion 28a is formed to extend in direction A. Into the insertion portion 28a, as shown in FIG. 5, the other end of the dichroic filter 25 is inserted. This makes it possible to adjust the tilt angle of the dichroic filter 25 with respect to the light emission surfaces 21e of the pseudo white LEDs 21 by moving the slide member 28 in a direction (direction B) that is perpendicular to the light emission surfaces 21e of the pseudo white LEDs 21.

As shown in FIG. 12, a screw hole 28b is formed in each of two end portions of the slide member 28 in direction A. In the first embodiment, the slide member 28 is fastened to the step portion 26c with a screw screwed into the screw hole 28b at each of the two end portions of the slide member 28 and a corresponding one of the screw holes 26e, the screw holes 26f or the screw holes 26g of the step portion 26c (see FIG. 11), and thereby the tilt angle of the dichroic filter 25 (see FIG. 5) is adjusted and the other end of the dichroic filter 25 is fixed.

Figure 13:
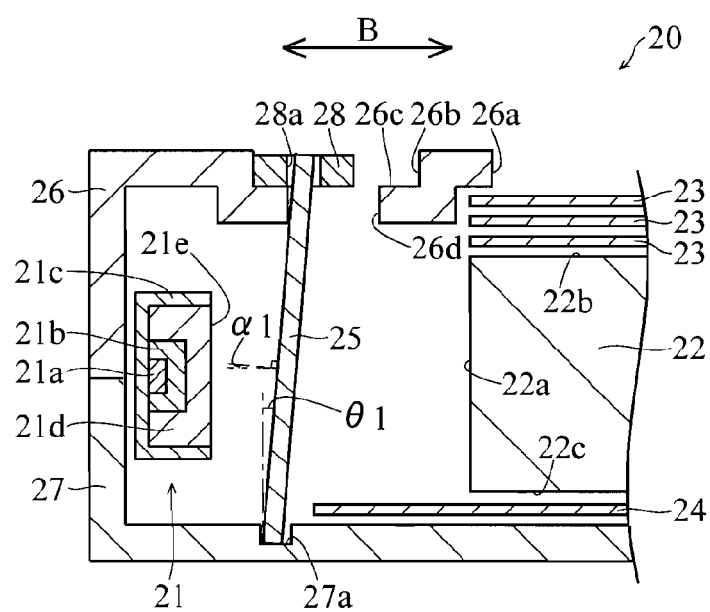
FIG. 13 is a sectional view showing the structure in the vicinity of the dichroic filter used in the backlight device according to the first embodiment shown in FIG. 2.

Specifically, when the slide member 28 is screw-fastened by using the screw holes 28b of the slide member 28 (see FIG. 12) and the screw holes 26e of the step portion 26c (see FIG. 11), the tilt angle of the dichroic filter 25 with respect to the light emission surfaces 21e of the pseudo white LEDs 21 is $\theta 1=5°$ as shown in FIG. 13. In this state, the incident angle at which light emitted from the pseudo white LEDs 21 is incident on the dichroic filter 25 is $\alpha 1=5°$.

When the slide member 28 is screw-fastened by using the screw holes 28b of the slide member 28 (see FIG. 12) and the screw holes 26f of the step portion 26c (see FIG. 11), the tilt angle of the dichroic filter 25 with respect to the light emission surfaces 21e of the pseudo white LEDs 21 is $\theta 2=10°$ as shown in FIG. 5. In this state, the incident angle at which light emitted from the pseudo white LEDs 21 is incident on the dichroic filter 25 is $\alpha 2=10°$.

Figure 14:
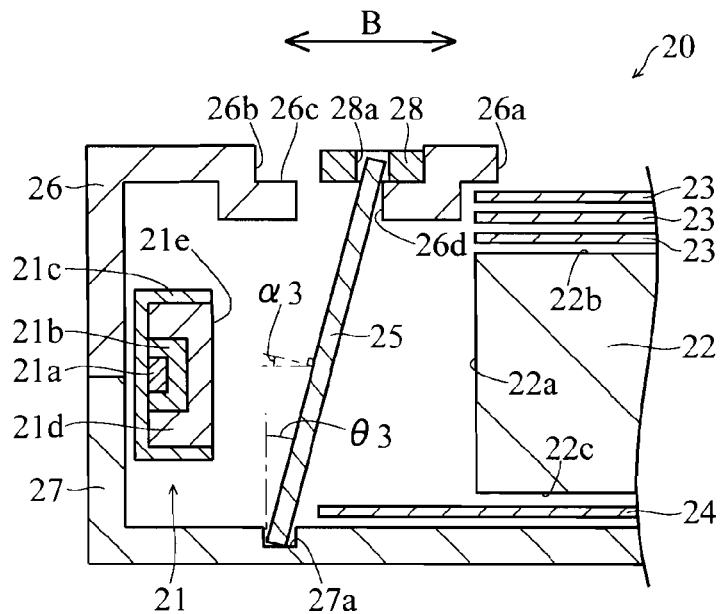
FIG. 14 is a sectional view showing the structure in the vicinity of the dichroic filter used in the backlight device according to the first embodiment shown in FIG. 2.

When the slide member 28 is screw-fastened by using the screw holes 28b of the slide member 28 (see FIG. 12) and the screw holes 26g of the step portion 26c (see FIG. 11), the tilt angle of the dichroic filter 25 with respect to the light emission surfaces 21e of the pseudo white LEDs 21 is θ3=15° as shown in FIG. 14. In this state, the incident angle at which light emitted from the pseudo white LEDs 21 is incident on the dichroic filter 25 is α3=15°.

Next, a description will be given of a method of adjusting the reflectance (transmittance) at which the dichroic filter 25 reflects (transmits) light with reference to FIGS. 2, 5, 13, and 14.

In a case in which the light emission spectrum of pseudo white light emitted from the pseudo white LEDs 21 is, for example, as designed, the tilt angle of the dichroic filter 25 with respect to the light emission surfaces 21e of the pseudo white LEDs 21 is set to θ2=10° as shown in FIG. 5. In this state, the incident angle at which light emitted from the pseudo white LEDs 21 is incident on the dichroic filter 25 is α2=10°.

In a case in which blue light included in pseudo white light emitted from the pseudo white LEDs 21 is shifted to the long wavelength side, or in a case in which light (for example, light in the wavelength band from green to red) included in the pseudo white light and having a longer wavelength than blue light is shifted to the short wavelength side, the tilt angle of the dichroic filter 25 with respect to the light emission surfaces 21e of the pseudo white LEDs 21 is set to θ3=15° as shown in FIG. 14. In this state, the incident angle at which light emitted from the pseudo white LEDs 21 is incident on the dichroic filter 25 is α3=15°. Thus, the reflectance of light whose wavelength is about 490 nm-about 510 nm (that is, a wavelength around 500 nm) can be increased (that is, the transmittance thereof can be reduced). As a result, light after passing through the liquid crystal display panel 12 (see FIG. 2) can be prevented from including a large amount of light whose wavelength is between B (blue) and G (green) (that is, a wavelength of about 490 nm-about 510 nm).

In a case in which blue light included in pseudo white light emitted from the pseudo white LEDs 21 is shifted to the short wavelength side and also light included in the pseudo white light and having a longer wavelength than blue light is shifted to the long wavelength side, the tilt angle of the dichroic filter 25 with respect to the light emission surfaces 21e of the pseudo white LEDs 21 is set to θ1=5° as shown in FIG. 13. In this state, the incident angle at which light emitted from the pseudo white LEDs 21 is incident on the dichroic filter 25 is α1=5°. Thus, the reflectance of light whose wavelength is between B (blue) and G (green) can be reduced (the transmittance thereof can be increased). More specifically, the reflectance of light having a wavelength of about 490 nm-about 510 nm can be reduced and the wavelength band of reflected light can be made narrower. As a result, pseudo white light emitted from the pseudo white LEDs 21 can be prevented from vainly reflected by the dichroic filter 25.

The method of adjusting the reflectance (transmittance) at which the dichroic filter 25 reflects (transmits) light is just an example, and may be changed as necessary according to factors such as the light emission spectrum of pseudo white light emitted from the pseudo white LEDs 21, the reflection (transmission) characteristic of the dichroic filter 25, and the required brightness.

In the first embodiment, as hitherto described, the dichroic filter 25 is structured such that the reflectance (transmittance) of light having a wavelength of about 490 nm-about 510 nm (a wavelength around 500 nm) is changed by changing the incident angle of light, and the reflectance (transmittance) of light having a wavelength of about 490 nm-about 510 nm (a wavelength around 500 nm) that is included in pseudo white light emitted from the pseudo white LEDs 21 can be controlled by structuring the dichroic filter 25 such that the tilt angle thereof with respect to the light emission surfaces 21e of the pseudo white LEDs 21 is adjustable. In this way, in a case in which the variation in wavelength, etc., of pseudo white light emitted from the pseudo white LEDs 21 is large, light having a wavelength of about 490 nm-about 510 nm can be sufficiently reflected by the dichroic filter 25. As a result, light that has passed through the liquid crystal display panel 12 can be prevented from including a large amount of light whose wavelength is between B (blue) and G (green) (light having a wavelength of about 490 nm-about 510 nm), and this helps improve color hues and color purity on the liquid crystal display panel 12. On the other hand, in a case in which the variation in wavelength, etc., of pseudo white light emitted from the pseudo white LEDs 21 is small, the reflectance at which the dichroic filter 25 reflects light can be reduced. As a result, unnecessary reflection of light can be prevented, and this helps prevent degradation in brightness of the liquid crystal display panel 12.

Also, in the first embodiment, the tilt angle of the dichroic filter 25 with respect to the light emission surfaces 21e of the pseudo white LEDs 21 is increased to increase the reflectance (to reduce the transmittance) of light having a wavelength of about 490 nm-about 510 nm, while the tilt angle of the dichroic filter 25 with respect to the light emission surfaces 21e of the pseudo white LEDs 21 is reduced to reduce the reflectance (to increase the transmittance) of light having a wavelength of about 490 nm-about 510 nm. This makes it possible to easily control the reflectance (transmittance) of light having a wavelength of about 490 nm-about 510 nm included in pseudo white light emitted from the pseudo white LEDs 21.

Also, in the first embodiment, the dichroic filter 25 is arranged between the light emission surfaces 21e of the pseudo white LEDs 21 and the light incident surface 22a of the light guide plate 22. Here, the light incident surface 22a of the light guide plate 22 is smaller in area than the light emission surface 22b, and thus, the dichroic filter 25 can be made smaller than in a case in which it is arranged on the light emission surface 22b side of the light guide plate 22.

Also, in the first embodiment the pseudo white LED 21 is composed of the blue light emitting element 21a and the fluorescent material 21b having a function of converting light emitted from the blue light emitting element 21a into light having a longer wavelength than blue light. Pseudo white light emitted from the pseudo white LED 21 including the blue light emitting element 21a and the fluorescent material 21b includes a particularly large amount of light whose wavelength is between B (blue) and G (green) (a wavelength of about 490 nm-about 510 nm), and thus, it is particularly effective to apply the present invention to the backlight device 20 using the pseudo white LED 21 including the blue light emitting element 21a and the fluorescent material 21b.

Also, in the first embodiment, the rear chassis 27 has the recess 27a in which one end of the dichroic filter 25 is engaged, and the tilt angle of the dichroic filter 25 with respect to the light emission surfaces 21e of the pseudo white LEDs 21 can be adjusted by rotating the dichroic filter 25 around the recess 27a of the rear chassis 27. This makes it easy to adjust the tilt angle of the dichroic filter 25 with respect to the light emission surfaces 21e of the pseudo white LEDs 21.

Also, in the first embodiment, the slide member 28 for fixing another end of the dichroic filter 25 is fitted to the other end of the dichroic filter 25, and this makes it possible to easily hold constant the tilt angle of the dichroic filter 25 with respect to the light emission surfaces 21e of the pseudo white LEDs 21.

Also, in the first embodiment, the slide member 28 is fitted to the other end of the dichroic filter 25 such that the slide member 28 moves in a direction (direction B) that is perpendicular to the light emission surfaces 21e of the pseudo white LEDs 21 to adjust the tilt angle of the dichroic filter 25. This makes it possible to adjust the tilt angle of the dichroic filter 25 more easily.

Also, in the first embodiment, the dichroic filter 25 is structured such that it reflects light having a wavelength of 490 nm-510 nm included in pseudo white light emitted from the pseudo white LEDs 21 at a predetermined ratio. Since the wavelength of B (blue) light and the wavelength of G (green) light are closer to each other than the wavelength of G (green) light and the wavelength of R (red) light are to each other, it is particularly effective to use the dichroic filter 25 to reflect light having a wavelength of 490 nm-510 nm.

Also, in the first embodiment, the dichroic filter 25 has a multi-layered film formed with layers 25d and 25e having different refractive indices stacked together, and another multi-layered film formed with layers 25f and 25g having different refractive indices stacked together. This makes it possible to easily structure the dichroic filter 25 such that it reflects light having a wavelength of 490 nm-510 nm included in pseudo white light emitted from the pseudo white LEDs 21 at a predetermined ratio, and such that the reflectance of light having a wavelength of 490 nm-510 nm varies as the incident angle of light varies.

Second Embodiment

A description will be given of a second embodiment of the present invention with reference to FIGS. 15 and 16, and the description will deal with an example different from the first embodiment in that two dichroic filters 25 and 35 that respectively reflect light having different wavelengths (wavelength bands) are provided.

Figure 15:
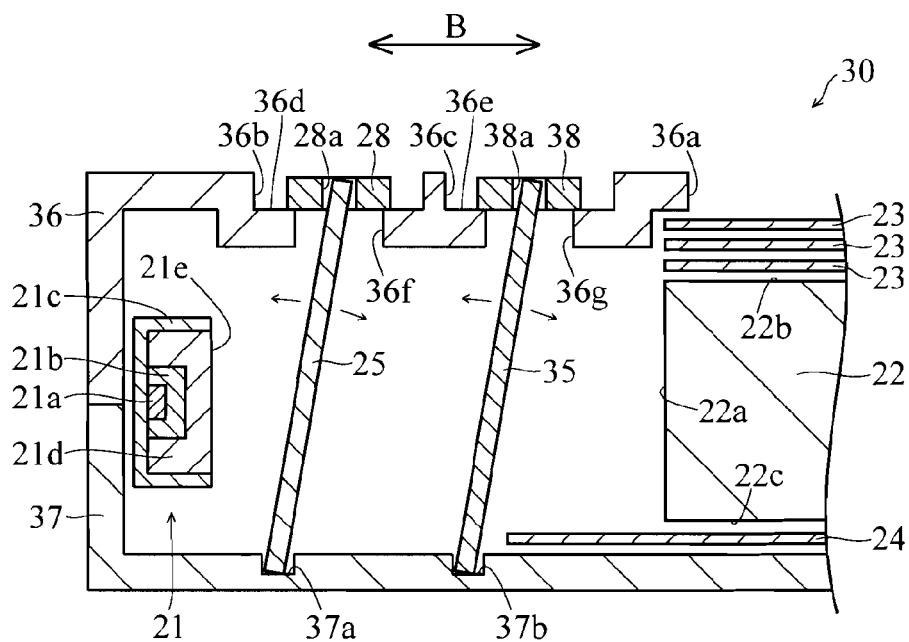
FIG. 15 is a sectional view showing the structure of a backlight device according to a second embodiment of the present invention.

As shown in FIG. 15, a backlight device 30 is composed of a plurality of pseudo white LEDs 21, a light guide plate 22, a plurality of optical sheets 23, a reflection sheet 24, dichroic filters 25 and 35 arranged between the pseudo white LEDs 21 and the light guide plate 22, and a front chassis 36 and a rear chassis 37 in which these components are housed. The dichroic filter 25 is an example of the "filter member" and the "first filter member" of the present invention, and the dichroic filter 35 is an example of the "filter member" and the "second filter member" of the present invention. The front chassis 36 and the rear chassis 37 are an example of the "housing member" of the present invention.

Both the dichroic filters 25 and 35 are arranged between light emission surfaces 21e of the pseudo white LEDs 21 and a light incident surface 22a of the light guide plate 22, with a predetermined distance provided between the dichroic filters 25 and 35. That is, the dichroic filter 25 is arranged within a region through which light emitted from the pseudo white LEDs 21 passes.

The dichroic filters 25 and 35 are each composed of an unillustrated glass substrate, a vapor deposition film formed on one surface of the glass substrate as a multi-layered film of two layers having different refractive indices laid on top of the other, and another vapor deposition film formed on the other surface of the glass substrate as a multi-layered film of two layers having different refractive indices laid on top of the other.

Figure 16:
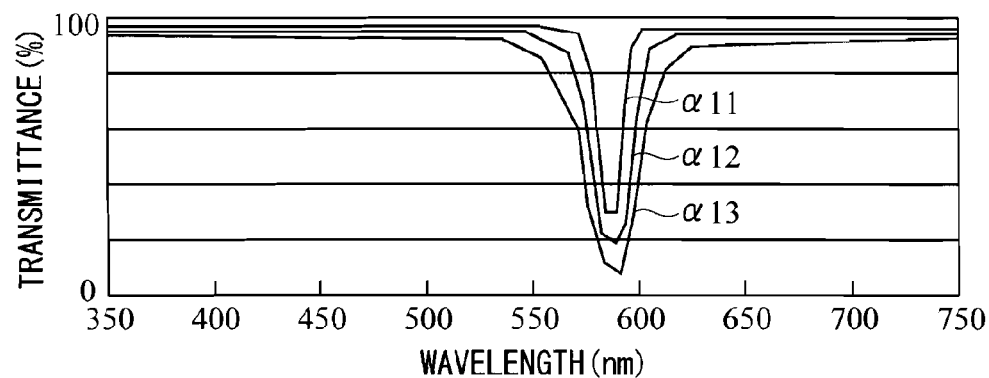
FIG. 16 is a diagram showing the transmission characteristic (reflection characteristic) of a dichroic filter 35 used in the backlight device according to the second embodiment shown in FIG. 15.

Here, in the second embodiment, the dichroic filter 35 has a function of reflecting (transmitting) light having a wavelength of about 570 nm-about 590 nm (a wavelength around 580 nm) at a predetermined ratio as shown in FIG. 16. Also, the dichroic filter 35 is structured such that reflectance (transmittance) of light varies as the incident angle of light varies. Specifically, the dichroic filter 35 is structured such that the reflectance of light having a wavelength of about 570 nm-about 590 nm increases as the incident angle of light increases from $\alpha 11=5°$ to $\alpha 12=10°$, $\alpha 13=15°$. That is, the dichroic filter 35 is structured such that the transmittance of light having a wavelength of about 570 nm-about 590 nm decreases as the incident angle of light increases. Furthermore, the dichroic filter 35 is structured such that the wavelength band in which the dichroic filter 35 reflects light becomes wider as the incident angle of light increases from $\alpha 11=5°$ to $\alpha 12=10°$, $\alpha 13=15°$.

Also, in the second embodiment, the dichroic filter 35 is, as shown in FIG. 15, arranged so as to be tilted with respect to the light emission surfaces 21e of the pseudo white LEDs 21. Also, the dichroic filter 35 is formed such that the tilt angle at which the dichroic filter 25 is tilted with respect to the light emission surfaces 21e of the pseudo white LEDs 21 is adjustable as will be described later.

Also, in the second embodiment, in the rear chassis 37, there are formed a recess 37a in which one end of the dichroic filter 25 is engaged and a recess 37b in which one end of the dichroic filter 35 is engaged. And, by rotating the dichroic filter 25 around the recess 37a of the rear chassis 37 with the one end of the dichroic filter 25 engaged in the recess 37a of the rear chassis 37, the tilt angle of the dichroic filter 25 with respect to the light emission surfaces 21e of the pseudo white LEDs 21 is adjusted. Also, by rotating the dichroic filter 35 around the recess 37b of the rear chassis 37 with the one end of the dichroic filter 35 engaged in the recess 37b of the rear chassis 37, the tilt angle of the dichroic filter 35 with respect to the light emission surfaces 21e of the pseudo white LEDs 21 is adjusted. The recesses 37a and 37b are an example of the "engagement portion" of the present invention.

In the front chassis 36, there are provided an opening 36a formed corresponding to the front side of the optical sheets 23, and recesses 36b and 36c formed with a predetermined distance from the opening 26a. In the recesses 36b and 36c, step portions 36d and 36e are formed, respectively. In addition, in the step portions 36d and 36e, insertion portions 36f and 36g are formed, respectively. Into the insertion portion 36f, another end of the dichroic filter 25 is inserted. Into the insertion portion 36g, another end of the dichroic filter 35 is inserted. The recesses 36b and 36c are otherwise structured in the same manner as the recess 26b of the first embodiment.

In the recesses 36b and 36c, slide members 28 and 38 are placed, respectively. The slide member 38 is formed in the same shape as the slide member 28, and is movable in direction B inside the recess 36c. The slide member 38 is an example of the "fixing member" and the "angle adjustment member" of the present invention.

Into the insertion portion 38a of the slide member 38, the other end of the dichroic filter 35 is inserted. This makes it possible to adjust the tilt angle of the dichroic filter 35 with respect to the light emission surfaces 21e of the pseudo white LEDs 21 by moving the slide member 38 in a direction (direction B) perpendicular to the light emission surfaces 21e of the pseudo white LEDs 21.

As in the slide member 28, on each of two end portions of the slide member 38, an unillustrated screw hole is formed. And, by inserting a screw into the screw hole of the slide member 38 and an unillustrated screw hole formed in the step portion 36e, the tilt angle of the dichroic filter 35 is adjusted and the other end of the dichroic filter 35 is fixed.

Thus, in the second embodiment, the dichroic filters 25 and 35 are structured such that the tilt angles at which they are tilted with respect to the light emission surfaces 21e of the pseudo white LEDs 21 are independently adjustable.

The other features of the second embodiment are similar to those of the first embodiment.

Also, the reflectances (the transmittances) at which the dichroic filters 25 and 35 of the second embodiment reflect (transmit) light are adjusted in the same manner as in the first embodiment.

In the second embodiment, as described above, as a result of the provision of the dichroic filter 25 reflecting light having a wavelength of about 490 nm-about 510 nm (a wavelength of around 500 nm) at a predetermined ratio and the dichroic filter 35 reflecting light having a wavelength of about 570 nm-about 590 nm (a wavelength around 580 nm) at a predetermined ratio, both light having a wavelength of about 490 nm-about 510 nm and light having a wavelength of about 570 nm-about 590 nm can be sufficiently reflected. This helps further improve color hues and color purity on the liquid crystal display panel 12.

Also, in the second embodiment, by independently adjusting the tilt angles of the dichroic filters 25 and 35 with respect to the light emission surfaces 21e of the pseudo white LEDs 21, the reflectance (transmittance) of light having a wavelength of about 490 nm-about 510 nm and that of light having a wavelength of about 570 nm-about 590 nm can be independently controlled. This helps further improve color hues and color purity on the liquid crystal display panel 12.

The other advantages of the second embodiment are similar to the advantages of the first embodiment.

Third Embodiment

A description will be given of a third embodiment of the present invention with reference to FIG. 17. The description will deal with an example in which, unlike the first embodiment, pseudo white LEDs 21 and a dichroic filter 25 are arranged on both sides of a light guide plate 22 in direction B.

Figure 17:
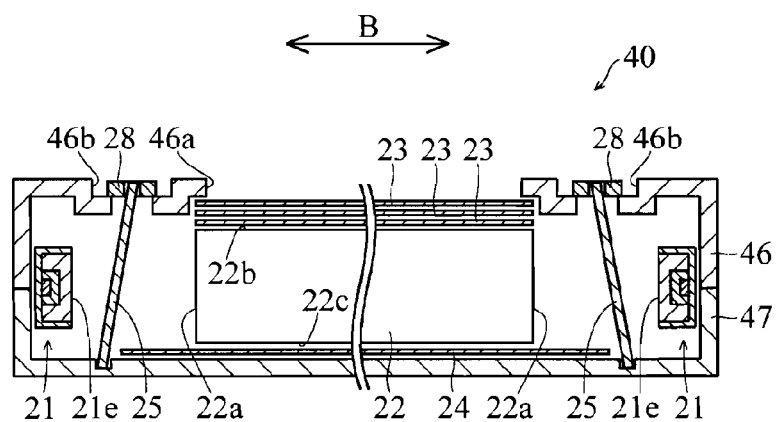
FIG. 17 is a sectional view showing the structure of a backlight device according to a third embodiment of the present invention.

As shown in FIG. 17, a backlight device 40 is composed of a plurality of pseudo white LEDs 21, a light guide plate 22 having a pair of light incident surfaces 22a, a plurality of optical sheets 23, a reflection sheet 24, two dichroic filters 25 arranged between the pseudo white LEDs 21 and the light guide plate 22, and a front chassis 46 and a rear chassis 47 in which these components are housed. The front chassis 46 and the rear chassis 47 are an example of the "housing member" of the present invention.

Here, in the third embodiment, the pseudo white LEDs 21 and the dichroic filters 25 are arranged on both side of the light guide plate 22 in direction B.

Also, in the third embodiment, the rear chassis 47 has formed therein two recesses 47a in which one ends of the dichroic filters 25 are engaged. The recesses 47a are an example of the "engagement portion" of the present invention.

In the front chassis 46, there are provided an opening 46a formed corresponding to the front side of the optical sheets 23 and two recesses 46b formed on both sides of the opening 46a in direction B. The recesses 46b are otherwise structured in the same manner as the recess 26b of the first embodiment.

The other structures, the method of adjusting the reflectances (the transmittances) at which the dichroic filters 25 reflect (transmit) light, and the advantages of the third embodiment are the same as those of the first embodiment.

The embodiments disclosed herein are to be considered in all respects as illustrative and not restrictive. The scope of the present invention is set out in the appended claims and not in the description of the embodiments hereinabove, and includes any variations and modifications within the sense and scope equivalent to those of the claims.

For example, the embodiments each deals with an example in which the display panel, the display device and the television receiver of the present invention are applied to a liquid crystal display panel, a liquid crystal display device and a liquid crystal television receiver, respectively. This, however, is not meant to limit the present invention, and they may be applied to a display panel, a display device and a television receiver other than a liquid crystal display panel, a liquid crystal display device, and a liquid crystal television receiver, respectively.

Also, the embodiments each deal with an example in which the present invention is applied to an edge-light type backlight device, but this is not meant to limit the present invention, and the present invention may be applied to a direct backlight device. In this case, a diffusion plate or the like may be used as the light transmitting member.

Figure 18:
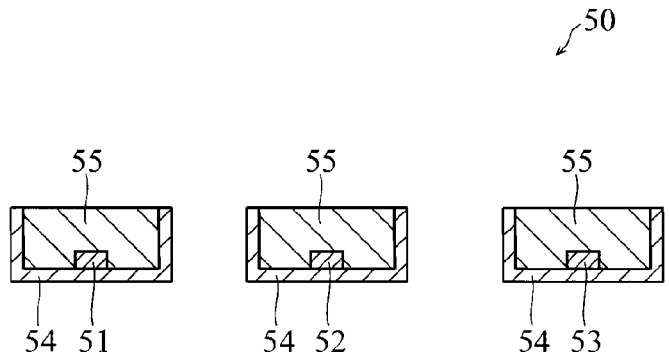
FIG. 18 is a sectional view showing the structure of a white light source according to a first modified example of the present invention.
Figure 19:
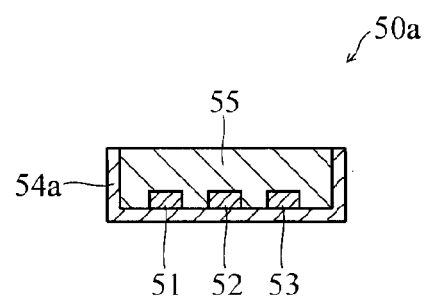
FIG. 19 is a sectional view showing the structure of a white light source according to a second modified example of the present invention.

Also, the embodiments each deal with an example in which a pseudo white LED formed with a blue light emitting element and a fluorescent material is used as the white light source, but this is not meant to limit the present invention, and a pseudo white LED formed with components other than a blue light emitting element and a fluorescent material may be used instead. Or, an RGB-LED formed with blue, green and red light emitting elements may be used. In this case, as in a white light source 50 according to a first modified example of the present invention shown in FIG. 18, a blue light emitting element 51, a green light emitting element 52, and a red light emitting element 53 may be housed in different package main bodies 54. Or instead, as in a white light source 50a of a second modified example of the present invention shown in FIG. 19, the blue light emitting element 51, the green light emitting element 52, and the red light emitting element 53 may be housed in one package main body 54a. The first and second modified examples of the present invention shown in FIGS. 18 and 19, respectively, are different from the embodiments in that there is no need of providing a fluorescent material, and thus, the package main bodies 54 and 54a are filled with a protection material 55 for protecting the blue light emitting element 51, the green light emitting element 52, and the red light emitting element 53.

The embodiments each deal with an example in which a dichroic filter is used as the filter member, but this is not meant to limit the present invention, and a filter member other than a dichroic filter may be used.

The embodiments each deal with an example in which a dichroic filter is formed so as to absorb light having a wavelength of about 490 nm-about 510 nm or light having a wavelength of about 570 nm-about 590 nm, but this is not meant to limit the present invention, and a dichroic filter may be structured so as to absorb light having a wavelength of not about 490 nm-about 510 nm or light having a wavelength of not about 570 nm-about 590 nm.

The embodiments each deal with an example provided with one or two dichroic filters, but this is not meant to limit the present invention, and three or more dichroic filters may be provided.

Figure 20:
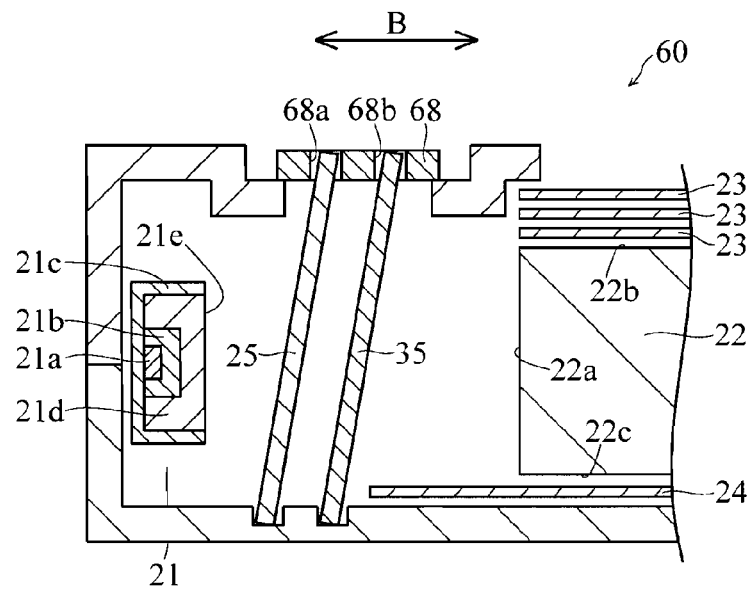
FIG. 20 is a sectional view showing the structure of a backlight device according to a third modified example of the present invention.

The second embodiment deals with an example in which the structure is such that the tilt angles of two dichroic filters with respect to the light emission surfaces of pseudo white LEDs are independently adjusted. However, this is not meant to limit the present invention, and as in a backlight device 60 of a third modified example of the present invention shown in FIG. 20, the tilt angles of two dichroic filters 25 and 35 with respect to light emission surfaces 21e of pseudo white LEDs 21 may be synchronously (simultaneously) adjusted. Specifically, in the backlight device 60 according to the third modified example of the present invention, as shown in FIG. 20, two insertion portions 68a and 68b are formed in one slide member 68, and into these two insertion portions 68a and 68b, the other ends of the dichroic filters 25 and 35 are inserted, respectively. With this structure, the tilt angles of the two dichroic filters 25 and 35 can be synchronously (simultaneously) adjusted by moving the one slide member 68 in direction B.

The embodiments each deal with an example in which the reflectance at which a dichroic filter reflects light is adjusted if light (blue light or light having a wavelength longer than blue light) emitted from pseudo white LEDs is shifted to the short or long wavelength side. However, this is not meant to limit the present invention, and even if light emitted from the pseudo white LEDs is not shifted to the short or long wavelength side, if the transmission characteristics of B, G and R regions of a color filter are shifted to the short or long wavelength side, the reflectance at which the dichroic filter reflects light may be adjusted.

The embodiments each deal with an example in which the tilt angle of a dichroic filter is adjusted to 5°, 10° or 15°, but this is not meant to limit the present invention, and the tilt angle of a dichroic filter may be adjusted to angles other than 5°, 10° and 15°. Or, a dichroic filter may be structured such that its tilt angle varies continuously.

Figure 21:
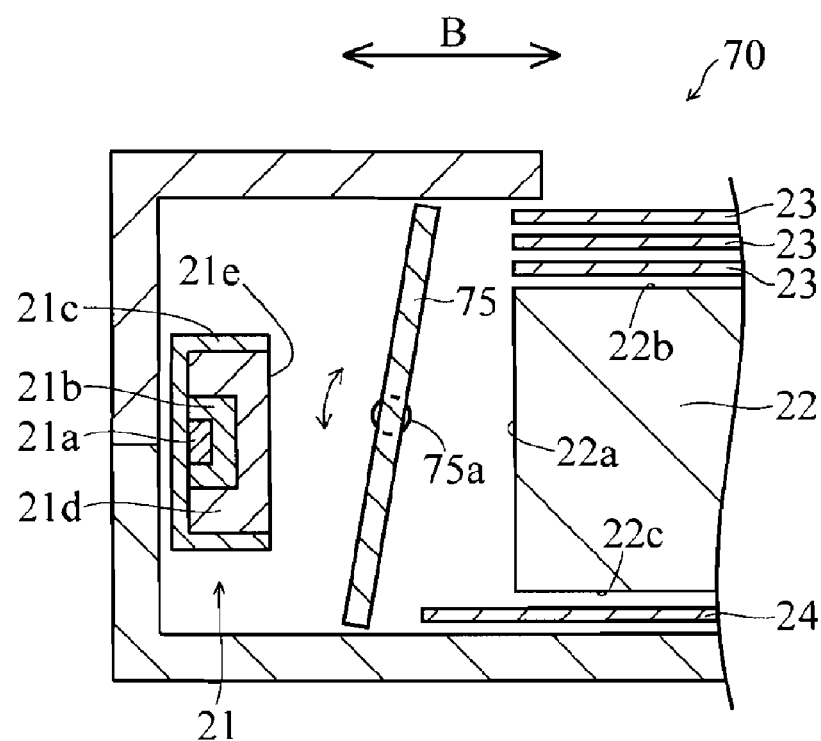
FIG. 21 is a sectional view showing the structure of a backlight device according to a fourth modified example of the present invention.

The embodiments each deal with an example in which the tilt angle of a dichroic filter is adjusted by using a slide member to rotate the dichroic filter around its one end, but this is note meant to limit the present invention, and the tilt angle of a dichroic filter may be adjusted in any method different from the method in the above-described embodiments. For example, as shown in a backlight device 70 according to a fourth modified example of the present invention shown in FIG. 21, a rotation shaft 75a may be provided in the center portion of a dichroic filter 75 such that the tilt angle of the dichroic filter 75 is adjusted by rotating the dichroic filter 75 around its center portion (the rotation shaft 75a).

The embodiments each deal with an example in which an engagement portion in which one end of a dichroic filter is engaged is formed in the rear chassis, but this is not meant to limit the present invention, and the engagement portion in which one end of a dichroic filter is engaged may be formed in a member other than the rear chassis. In this case, the engagement member may be formed in a member other than the backlight device.

The embodiments each deal with an example in which a front chassis and a bezel are formed as two independent components, but this is not meant to limit the present invention, and the front chassis and the bezel may be formed integrally.

The embodiments each deal with an example in which a front chassis is structured to hold a light guide plate, optical sheets and the like, but this is not meant to limit the present invention, and an additional member may be provided in the front chassis for the purpose of holding the light guide plate, the optical sheets and the like. In this case, a recess in which the slide member is placed may be formed in the additional member.

The invention claimed is:

1. A backlight device, comprising:
a white light source having a first light emission surface;
a light transmitting member having a light incident surface on which light emitted from the first light emission surface of the white light source is incident, and a second light emission surface from which incident light is emitted; and
a filter member that is arranged in a region through which light emitted from the white light source passes, the filter member absorbing or reflecting, at a predetermined ratio, light having a predetermined wavelength included in light emitted from the white light source,
wherein
the filter member is arranged so as to be tilted with respect to at least either the first light emission surface of the white light source or the second light emission surface of the light transmitting member,
wherein
the filter member is structured such that absorptance or reflectance of light having the predetermined wavelength varies as an incident angle of light varies, and
wherein
the filter member is structured such that a tilt angle at which the filter member is tilted with respect to at least either the first light emission surface of the white light source or the second light emission surface of the light transmitting member is adjustable.

2. The backlight device according to claim 1,
wherein
the filter member is adjusted such that the tilt angle at which the filter member is tilted with respect to at least either the first light emission surface of the white light source or the second light emission surface of the light transmitting member is increased so as to increase the absorptance or reflectance of light having the predetermined wavelength, while the tilt angle at which the filter member is tilted with respect to at least either the first light emission surface of the white light source or the second light emission surface of the light transmitting member is reduced so as to reduce the absorptance or reflectance of light having the predetermined wavelength.

3. A display device, comprising:
the backlight device according to claim 2; and
a display panel that is illuminated by the backlight device and includes a color filter.

4. The backlight device according to claim 1, wherein the light transmitting member includes a light guide plate.

5. The backlight device according to claim 4, wherein the filter member is arranged between the first light emission surface of the white light source and a light incident surface of the light transmitting member.

6. A display device, comprising:
the backlight device according to claim 4; and
a display panel that is illuminated by the backlight device and includes a color filter.

7. A display device, comprising:
the backlight device according to claim 5; and
a display panel that is illuminated by the backlight device and includes a color filter.

8. The backlight device according to claim 5,
wherein
the filter member is arranged to be tilted with respect to the first light emission surface of the white light source, and the filter member is structured such that the tilt angle at which the filter member is tilted with respect to the first light emission surface of the white light source is adjustable.

9. A display device, comprising:
the backlight device according to claim 8; and
a display panel that is illuminated by the backlight device and includes a color filter.

10. The backlight device according to claim 1,
wherein
the filter member has a function of absorbing or reflecting, at a predetermined ratio, light having a wavelength of 490 nm-510 nm included in light emitted from the white light source.

11. The backlight device according to claim 1,
wherein the filter member includes a dichroic filter having a multi-layered film formed with layers having different refractive indices stacked together.

12. The backlight device according to claim 1,
wherein
the filter member includes:
    a first filter member that absorbs or reflects light having a first wavelength at a predetermined ratio; and
    a second filter member that absorbs or reflects light having a second wavelength at a predetermined ratio.

13. The backlight device according to claim 12,
wherein the first and second filter members are structured such that angles at which the first and second filter members are tilted with respect to at least either the first light emission surface of the white light source or the second light emission surface of the light transmitting member are independently adjustable.

14. A display device, comprising:
the backlight device according to claim 1; and
a display panel that is illuminated by the backlight device and includes a color filter.

15. A television receiver, comprising:
the display device according to claim 14;
a cabinet in which the display device is housed;
a tuner; and
a speaker.

16. The backlight device according to claim 1,
wherein the white light source includes a blue light emitting element and a fluorescent material having a function of converting light emitted from the blue light emitting element into light having a longer wavelength than blue light.

17. A display device, comprising:
the backlight device according to claim 16; and
a display panel that is illuminated by the backlight device and includes a color filter.

18. The backlight device according to claim 1, further comprising:
    a housing member housing the white light source, the light transmitting member, and the filter member,
    wherein, in the housing member, there is formed an engagement portion in which one end of the filter member is engaged; and
    wherein the tilt angle at which the filter member is tilted with respect to at least either the first light emission surface of the white light source or the second light emission surface of the light transmitting member is adjusted by rotating the filter member around the engagement portion of the housing member.

19. The backlight device according to claim 18,
wherein another end of the filter member is provided with a fixing member fixing the other end of the filter member.

20. The backlight device according to claim 18,
wherein
an angle adjustment member is fitted to the other end of the filter member, the angle adjustment member adjusting the tilt angle at which the filter member is tilted with respect to at least either the first light emission surface of the white light source or the second light emission surface of the light transmitting member by moving in a direction perpendicular to the first light emission surface of the white light source.

* * * * *